United States Patent
Kikuchi et al.

(10) Patent No.: US 10,581,258 B2
(45) Date of Patent: *Mar. 3, 2020

(54) CHARGING SUPPORT DEVICE

(71) Applicant: DENSO TEN Limited, Kobe-shi, Hyogo (JP)

(72) Inventors: Ryuji Kikuchi, Kobe (JP); Norihito Nishino, Kobe (JP); Kenta Shimizu, Kobe (JP); Masakazu Cho, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,147

(22) Filed: Jun. 26, 2019

(65) Prior Publication Data

US 2019/0319469 A1    Oct. 17, 2019

Related U.S. Application Data

(62) Division of application No. 15/860,063, filed on Jan. 2, 2018.

(30) Foreign Application Priority Data

Feb. 24, 2017    (JP) .................................. 2017-033796

(51) Int. Cl.
   *B60L 1/00*    (2006.01)
   *H02J 7/00*    (2006.01)
   (Continued)

(52) U.S. Cl.
   CPC ............ *H02J 7/0047* (2013.01); *B60L 53/12* (2019.02); *B60L 53/37* (2019.02);
   (Continued)

(58) Field of Classification Search
   None
   See application file for complete search history.

(56) References Cited

U.S. PATENT DOCUMENTS 5,821,731 A * 10/1998 Kuki ...................... B60L 53/12
                                                        320/108
7,039,504 B2 * 5/2006 Tanaka ................. B62D 15/028
                                                        318/587

(Continued)

FOREIGN PATENT DOCUMENTS

JP    2004-114879 A    4/2004
JP    2012-209882 A    10/2012
JP    2014-100924 A    6/2014

OTHER PUBLICATIONS

Apr. 19, 2019 Office Action issued in U.S. Appl. No. 15/860,063.
Jul. 29, 2019 Office Action issued in U.S. Appl. No. 15/860,063.

*Primary Examiner* — Jonathan M Dager
(74) *Attorney, Agent, or Firm* — Oliff PLC

(57) ABSTRACT

A charging support device is used in charging a battery of a vehicle having a power reception unit on a bottom surface of the vehicle with power supplied from a power transmission device located outside the vehicle. The charging support device includes a controller that generates an overhead view image that displays a vehicle image of the vehicle and an image of a surrounding area of the vehicle captured by a camera. The controller displays, in the overhead view image, (i) a first mark indicating a position of the power reception unit and (ii) a second mark indicating a position of the power transmission device. The controller varies a color or a size of the second mark in a case where a positional relationship between the position of the power reception unit and the position of the power transmission device achieves a predetermined charging efficiency.

4 Claims, 16 Drawing Sheets

(51) Int. Cl.
*G06K 9/00* (2006.01)
*G06K 9/18* (2006.01)
*H02J 50/90* (2016.01)
*B60L 53/12* (2019.01)
*B60L 53/37* (2019.01)
*G06T 7/70* (2017.01)
*G06K 9/78* (2006.01)
*G06T 11/00* (2006.01)
*G06T 11/60* (2006.01)
*H02J 7/02* (2016.01)
*H02J 50/12* (2016.01)
*H02J 50/10* (2016.01)
*H04N 5/232* (2006.01)

(52) U.S. Cl.
CPC ..... *G06K 9/00671* (2013.01); *G06K 9/00805* (2013.01); *G06K 9/18* (2013.01); *G06K 9/78* (2013.01); *G06T 7/70* (2017.01); *G06T 11/001* (2013.01); *G06T 11/60* (2013.01); *H02J 7/025* (2013.01); *H02J 50/90* (2016.02); *B60L 2250/16* (2013.01); *G06T 2207/30261* (2013.01); *G06T 2207/30264* (2013.01); *H02J 50/10* (2016.02); *H02J 50/12* (2016.02); *H04N 5/23293* (2013.01)

(56) References Cited

U.S. PATENT DOCUMENTS

| | | | | |
|---|---|---|---|---|
| 7,903,842 | B2* | 3/2011 | Satonaka | G06T 7/74 180/167 |
| 8,823,551 | B1* | 9/2014 | Hoffman | G08G 1/04 340/932.2 |
| 9,024,578 | B2* | 5/2015 | Fisher | H02J 7/0052 320/108 |
| 9,187,006 | B2* | 11/2015 | Chen | B60L 11/1833 |
| 9,758,048 | B2* | 9/2017 | Ueda | H02J 5/005 |
| 9,889,756 | B2* | 2/2018 | Amari | B60L 11/182 |
| 9,917,620 | B2* | 3/2018 | Takatsu | H02J 50/10 |
| 9,919,611 | B2* | 3/2018 | Kim | B60L 11/1835 |
| 9,931,954 | B2* | 4/2018 | Sankaran | B60L 53/38 |
| 10,000,134 | B2* | 6/2018 | Zhang | B60L 11/1829 |
| 10,000,135 | B2* | 6/2018 | Yoshida | B62D 15/028 |
| 10,012,725 | B2* | 7/2018 | Sieber | B60L 53/124 |
| 10,081,264 | B2* | 9/2018 | Berger | H02J 7/025 |
| 10,141,748 | B2* | 11/2018 | Kautz | H02J 5/005 |
| 10,343,537 | B2* | 7/2019 | Widmer | H02J 7/025 |
| 2005/0228586 | A1* | 10/2005 | Yuasa | G01C 21/32 701/436 |
| 2008/0158011 | A1* | 7/2008 | Yamanaka | B62D 15/0275 340/932.2 |
| 2010/0117596 | A1* | 5/2010 | Cook | H01Q 1/2225 320/108 |
| 2010/0161217 | A1* | 6/2010 | Yamamoto | B60L 3/0046 701/408 |
| 2010/0201309 | A1* | 8/2010 | Meek | B60L 53/34 320/108 |
| 2010/0211267 | A1* | 8/2010 | Shimazaki | B60R 1/00 701/42 |
| 2010/0230197 | A1* | 9/2010 | Ortmann | B62D 15/0285 180/168 |
| 2010/0235006 | A1* | 9/2010 | Brown | B60L 11/1833 700/286 |
| 2010/0277121 | A1* | 11/2010 | Hall | B60L 53/60 320/108 |
| 2011/0254503 | A1* | 10/2011 | Widmer | B60L 3/0069 320/108 |
| 2011/0285349 | A1* | 11/2011 | Widmer | B60L 11/182 320/108 |
| 2012/0091959 | A1* | 4/2012 | Martin | B60L 11/1833 320/109 |
| 2012/0095617 | A1* | 4/2012 | Martin | B62D 15/028 701/1 |
| 2012/0098483 | A1* | 4/2012 | Patel | B62D 15/0285 320/108 |
| 2012/0200151 | A1* | 8/2012 | Obayashi | B60L 53/37 307/9.1 |
| 2012/0203410 | A1* | 8/2012 | Wechlin | B60L 53/36 701/22 |
| 2012/0262002 | A1* | 10/2012 | Widmer | B60L 53/65 307/104 |
| 2012/0320213 | A1* | 12/2012 | Ikeda | B60R 1/00 348/148 |
| 2013/0037339 | A1* | 2/2013 | Hickox | G01S 17/46 180/167 |
| 2013/0162825 | A1* | 6/2013 | Yoon | B60W 30/06 348/148 |
| 2013/0261953 | A1* | 10/2013 | Kiyama | G01C 21/3469 701/400 |
| 2013/0335015 | A1* | 12/2013 | Ichikawa | H02J 7/025 320/108 |
| 2014/0015328 | A1* | 1/2014 | Beaver | B60L 53/12 307/104 |
| 2014/0035565 | A1* | 2/2014 | Enthaler | G01B 7/14 324/207.17 |
| 2014/0092236 | A1* | 4/2014 | Findeisen | B60L 53/36 348/118 |
| 2014/0111152 | A1* | 4/2014 | Kai | H01M 10/44 320/108 |
| 2014/0132208 | A1* | 5/2014 | Fisher | H02J 7/025 320/108 |
| 2015/0061897 | A1* | 3/2015 | Kees | G08G 1/0968 340/932.2 |
| 2015/0073642 | A1* | 3/2015 | Widmer | G01C 21/36 701/22 |
| 2015/0224882 | A1* | 8/2015 | Brill | H01F 38/14 320/108 |
| 2015/0239354 | A1* | 8/2015 | Gorai | B60L 3/00 307/10.1 |
| 2015/0291048 | A1* | 10/2015 | Ichikawa | B60L 53/36 701/22 |
| 2015/0357828 | A1* | 12/2015 | Ichikawa | H01F 38/14 307/104 |
| 2016/0114686 | A1* | 4/2016 | Beattie, Jr. | B60L 11/182 320/108 |
| 2016/0159234 | A1* | 6/2016 | Lewis | B60R 1/00 701/22 |
| 2016/0218534 | A1* | 7/2016 | Islinger | H01F 38/14 |
| 2016/0332572 | A1* | 11/2016 | Gibeau | B60L 53/12 |
| 2016/0332573 | A1* | 11/2016 | Ignaczak | B60L 53/60 |
| 2016/0332575 | A1* | 11/2016 | Fukushima | H02J 7/025 |
| 2017/0063160 | A1* | 3/2017 | Sato | B60L 58/12 |
| 2017/0140603 | A1* | 5/2017 | Ricci | B60L 11/182 |
| 2018/0111494 | A1* | 4/2018 | Penilla | H02J 7/0027 |
| 2018/0244163 | A1* | 8/2018 | Takehara | G06Q 50/30 |
| 2019/0016218 | A1* | 1/2019 | Haag | H02J 7/0042 |

* cited by examiner

CHARGING SUPPORT DEVICE

This is a Division of application Ser. No. 15/860,063 filed Jan. 2, 2018, which in turn claims the benefit of Japanese Patent Application No. 2017-033796 filed Feb. 24, 2017. The disclosure of the prior applications is hereby incorporated by reference herein in its entirety.

BACKGROUND OF THE INVENTION

Field of the Invention

The present invention relates to a technology for supporting charging.

Description of the Background Art

As an electric vehicle (EV) that runs by an electric motor or a plug-in hybrid vehicle (PHV) that runs by the combination of an electric motor and a gasoline engine has come into wide use, a technology for supplying a power to a battery that accumulates a power for operating the vehicle in a non-contact manner has been developed. As a method of supplying the power in the non-contact manner, there is a method of arranging a power transmission coil of a power transmission unit and a power reception coil of a vehicle so as to face each other in a non-contact state and supplying a power by using the principle of electromagnetic induction or magnetic resonance (for example, JP 2014-100924 A and JP 2004-114879 A).

As the non-contact charging system that charges the vehicle, a method of charging the vehicle in a non-contact manner by respectively providing power transmission units (charging pads) in parking spaces within a parking lot and supplying a power to the vehicle parked in the parking space is generally used. There is a technology capable of displaying an overhead view image generated from an image acquired using a camera provided at the vehicle on a display within the vehicle and checking a position of the power transmission unit and a position of the vehicle in a case where the vehicle is parked in the parking space in such a non-contact charging system.

However, it is difficult to determine whether or not the position of the power transmission unit with respect to the vehicle is a position appropriate for charging in such a non-contact charging system.

SUMMARY OF THE INVENTION

According to an aspect of the present invention, a charging support device is used in charging a battery of a vehicle having a power reception unit on a bottom surface of the vehicle with power supplied from a power transmission device located outside the vehicle. The charging support device includes a controller that generates an overhead view image that displays a vehicle image of the vehicle and an image of a surrounding area of the vehicle captured by a camera. The controller displays, in the overhead view image, (i) a first mark indicating a position of the power reception unit and (ii) a second mark indicating a position of the power transmission device. The controller varies a color or a size of the second mark in a case where a positional relationship between the position of the power reception unit and the position of the power transmission device achieves a predetermined charging efficiency.

Accordingly, it is possible to easily determine whether or not the position of the power transmission device with respect to the vehicle is appropriate in the charging of the vehicle using a non-contact charging system.

According to another aspect of the present invention, a charging support device is used in charging a battery of a vehicle having a power reception unit located on a bottom surface of the vehicle with power supplied from a power transmission device located outside the vehicle. The charging support device includes a controller that generates an overhead view image that displays a vehicle image of the vehicle and an image of a surrounding area of the vehicle captured by a camera. The controller displays, in the overhead view image, (i) a first mark indicating a position of the power reception unit and (ii) a second mark indicating a position of the power transmission device. The controller varies a color or a size of at least one of the first and second marks in a case where a positional relationship between the position of the power reception unit and the position of the power transmission device achieves a predetermined charging efficiency.

Accordingly, it is possible to easily determine whether or not the position of the power transmission device with respect to the vehicle is appropriate in the charging of the vehicle using a non-contact charging system.

In addition, an object of the present invention is to provide a technology capable of easily determining whether or not a position of a power transmission device with respect to a vehicle is appropriate in the charging of the vehicle using a non-contact charging system.

These and other objects, features, aspects and advantages of the present invention will become more apparent from the following detailed description of the present invention when taken in conjunction with the accompanying drawings.

DESCRIPTION OF THE EMBODIMENTS

Hereinafter, an embodiment will be described with reference to the drawings. The configuration of the embodiment is merely an example, and the configuration of the invention is not limited to a specific configuration of the disclosed embodiment. The specific configuration corresponding to the embodiment may be appropriately adopted when the invention is implemented.

Embodiment

Configuration Example

Figure 1:
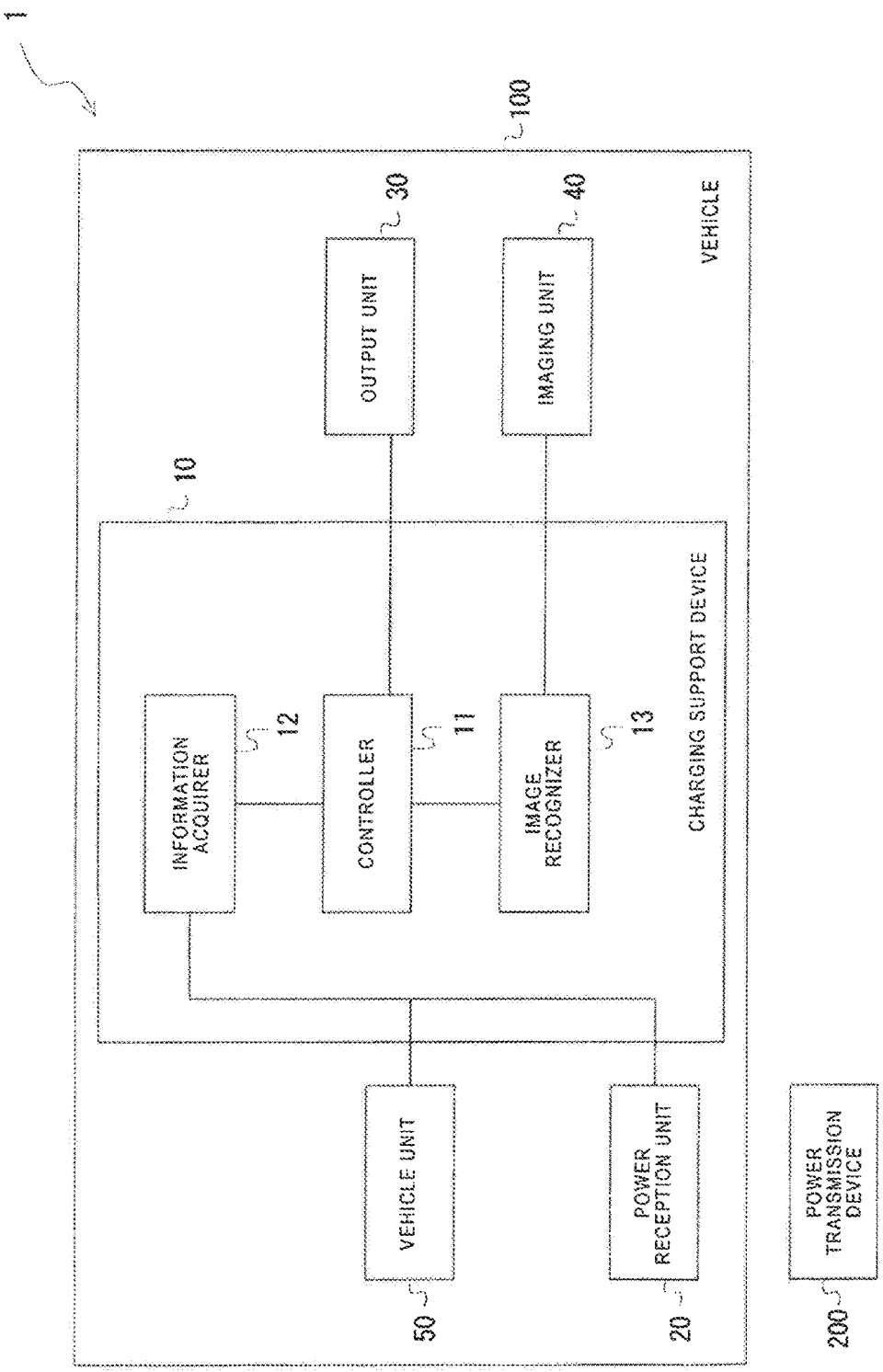
FIG. 1 is a diagram showing a configuration example of a non-contact charging system including a charging support device according to an embodiment.

FIG. 1 is a diagram showing a configuration example of a non-contact charging system including a charging support device according to the present embodiment. A non-contact charging system 1 shown in FIG. 1 includes a vehicle 100 driven by an electric motor and a power transmission device 200. For example, the vehicle 100 is an electric vehicle or a hybrid vehicle. The vehicle 100 includes the charging support device 10, a power reception unit 20, an output unit 30, an imaging unit 40, and a vehicle unit 50. In a case where the vehicle 100 is charged by the power transmission device 200, the charging support device 10 outputs information indicating whether or not a position of the vehicle 100 is appropriate to a driver of the vehicle 100. The charging support device 10 includes a controller 11, an information acquirer 12, and an image recognizer 13. The vehicle 100 may charge a battery of the vehicle 100 in a case where the power reception unit 20 of the vehicle 100 approaches the power transmission device 200. For example, the power transmission device 200 is provided on a road surface of a parking space. The power transmission device 200 may be provided so as to be buried in the road surface of the parking space.

The controller 11 is a control unit that performs arithmetic processing for supporting the charging using the power transmission device 200. The controller 11 acquires information regarding the vehicle 100 on which the charging support device 10 is mounted by the information acquirer 12. The controller 11 acquires an image captured by the imaging unit 40 provided toward the outside of the vehicle 100 by the image recognizer 13. The controller 11 outputs information for supporting the charging of the vehicle 100 through the output unit 30. The controller 11, the information acquirer 12, and the image recognizer 13 may be integrally operated as one controller.

The information acquirer 12 acquires information such as a state of the vehicle on which the charging support device 10 is mounted from the vehicle unit 50. For example, the information acquirer 12 acquires a shift lever position from a shift lever, a vehicle speed from a vehicle speed sensor, a vehicle acceleration from an acceleration sensor, a brake pressure from a brake, a parking brake state from a parking brake, a detection situation such as a target from a radar ECU, and a steering angle from a handle. The information items acquired by the information acquirer 12 are not limited thereto. The information acquirer 12 may be connected to the controller of the vehicle 100, and may acquire the information items. The information acquirer 12 stores the acquired information in a storage unit.

The image recognizer 13 acquires an image captured by the imaging unit 40 provided toward the outside of the vehicle 100. A plurality of imaging units 40 may be connected to the image recognizer 13. The image recognizer 13 may generate an image including a surrounding area of the vehicle 100 which is acquired by viewing the vehicle and the surrounding area of the vehicle in a direction of the vehicle 100 from above the vehicle 100 in overhead view, from the image captured by the imaging unit 40. The image recognizer 13 may generate an image by performing predetermined image processing such as distortion correction, trimming, or contrast changing on a captured image.

The power reception unit 20 includes a power reception coil and a battery. The power reception unit receives a power supplied from the power transmission device 200 by using the coil, and charges the battery with the received power. The battery is used as an energy supply source that drives the electric motor of the vehicle 100. The power reception unit 20 may include a communication unit that communicates with the power transmission device 200. For example, a surface perpendicular to a winding axis of the power reception coil is parallel to the ground. A position of the power reception unit 20 in the vehicle 100 is previously stored in the storage unit.

The output unit 30 outputs the image captured by the imaging unit 40 or the image generated by the controller 11. The output unit 30 is a display or a speaker. A display of a car navigation system mounted on the vehicle 100 may be used as the output unit 30. The display is provided in a position in which the display is able to be visually perceived from the driver's seat of the vehicle 100.

For example, the imaging unit 40 is a camera including a fisheye lens and a wide-angle lens. The imaging unit 40 is provided toward the outside of the vehicle 100. The imaging unit 40 may include a plurality of cameras. In the present embodiment, four cameras are provided in total at the vehicle 100 on front, rear, left, and right sides of the vehicle 100.

The vehicle unit 50 includes the constituent units of the vehicle 100. For example, the vehicle unit 50 includes the shift lever, the vehicle speed sensor, the acceleration sensor, the handle, the brake, the parking brake, the radar ECU, a temperature sensor, a microphone, and a camera. The shift lever is a lever that changes gears of the vehicle. For example, in a case where a position of a shift lever 110 is "R (reverse)", the vehicle is reversed. The radar ECU is an electric control unit (ECU) that detects the target in the surrounding area of the vehicle, and calculates a distance between the target in the surrounding area of the vehicle and the vehicle. The radar ECU calculates the distance between the vehicle and the target by using microwaves or the image captured by the imaging unit 40. The vehicle speed sensor is a sensor that detects a running speed of the vehicle. For example, the vehicle speed sensor detects a vehicle speed by using a rotational angle of a tire or a radius of the tire, and outputs the detected vehicle speed. The acceleration sensor is a sensor that detects an acceleration of the vehicle, and outputs the detected acceleration.

The power transmission device 200 includes a power transmission coil, an amplifier, a communication unit, and a control unit. The power transmission device 200 supplies a power to the vehicle 100 including the power reception unit 20 through the power transmission coil. A surface perpendicular to a winding axis of the power transmission coil is parallel to the ground. In a case where a position of the power transmission coil of the power transmission device 200 and a position of the power reception coil of the power reception unit 20 of the vehicle 100 are not appropriate, charging efficiency is reduced. In order to efficiently perform charging, it is necessary to appropriately set the position of the power transmission coil of the power transmission device 200 and the position of the power reception coil of the power reception unit 20 of the vehicle 100. For example, in a case where the center of the power transmission coil of the power transmission device 200 and the center of the power reception coil of the power reception unit 20 of the vehicle 100 match each other in overhead view from the information of the vehicle 100, charging efficiency is the highest. The longer the distance between the central position of the power transmission coil and the central position of the power reception coil is, the lower power reception efficiency is.

Figure 2:
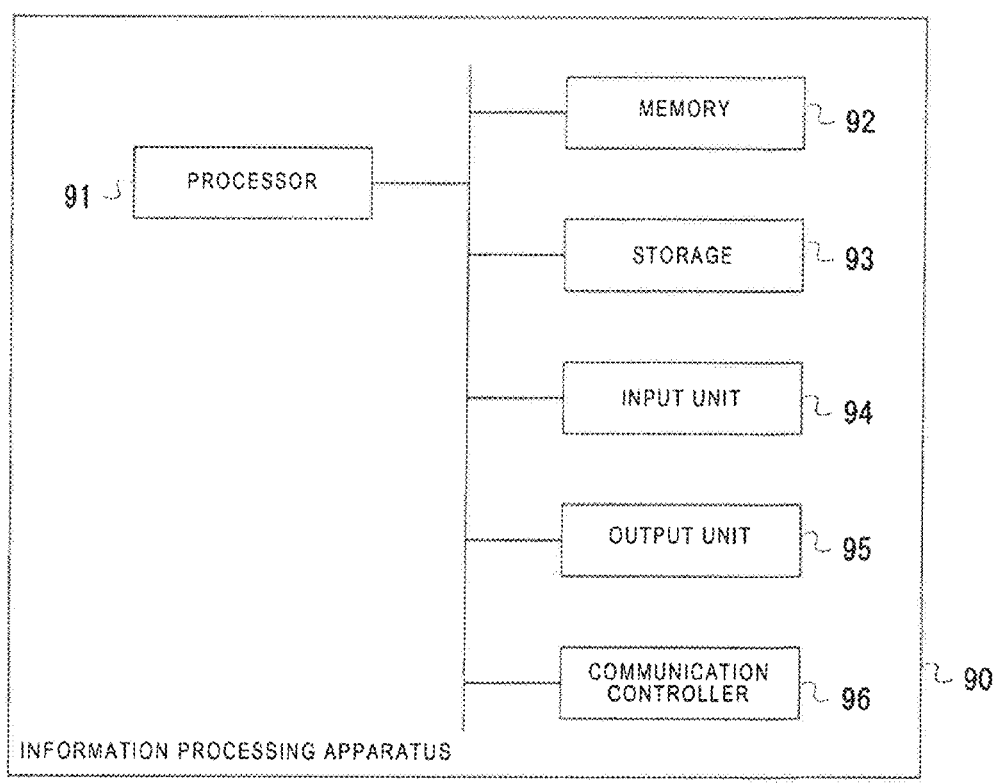
FIG. 2 is a diagram showing a hardware configuration example of an information processing apparatus.

FIG. 2 is a diagram showing a hardware configuration example of an information processing apparatus. An information processing apparatus 90 shown in FIG. 2 has the same configuration as that of a general computer. The charging support device 10 is realized by using the information processing apparatus 90 shown in FIG. 2. The information processing apparatus 90 of FIG. 2 includes a processor 91, a memory 92, a storage 93, an input unit 94, an output unit 95, and a communication controller 96. These units are connected through a bus. The memory 92 and the storage 93 are computer-readable recording media. A hardware configuration of the information processing apparatus is not limited to the example shown in FIG. 2, and the constituent elements may be appropriately omitted, replaced, and added.

The processor 91 loads the program stored in a recording medium into a work area of the memory 92, and executes the loaded program. Accordingly, the constituent units are controlled by executing the program, and thus, the information processing apparatus 90 may realize a function corresponding to a predetermined purpose.

The processor 91 is, for example, a central processing unit (CPU) or a digital signal processor (DSP).

The memory 92 includes, for example, a random access memory (RAM) or a read only memory (ROM). The memory 92 is also called a main storage device.

The storage 93 is, for example, an erasable programmable ROM (EPROM) or a Hard disk drive (HDD). The storage 93 may include a removable medium, that is, a portable recording medium. The removable medium is, for example, a universal serial bus (USB) memory or a disc recording medium such as a compact disc (CD) or a digital versatile disc (DVD). The storage 93 is also called a secondary storage device.

The storage 93 stores various programs, various data items, and various tables which are used in the information processing apparatus 90 in the recording medium in a readable and writable manner. An operating system (OS), various programs, and various tables are stored in the storage 93. Information items stored in the storage 93 may be stored in the memory 92. The information items stored in the memory 92 may be stored in the storage 93.

The operating system is software that mediates between software and hardware, manages memory spaces, manages files, and manages processes or tasks. The operating system includes a communication interface. The communication interface is a program that exchanges data with another external device connected through the communication controller 96. The external device includes, for example, another information processing apparatus and an external storage device.

The input unit 94 includes a keyboard, a pointing device, a wireless remote controller, and a touch panel. The input unit 94 may include an input device such as a camera that receives videos or images or an input device such as a microphone that receives voice.

The output unit 95 includes a display device such as a liquid crystal display (LCD), an electroluminescence (EL) panel, a cathode ray tube (CRT) display, or a plasma display panel (PDP), and an output device such as a printer. The output unit 95 may include an output device such as a speaker that outputs voice.

The communication controller 96 is connected to other devices, and controls communication between the information processing apparatus 90 and other devices. The communication controller 96 is, for example, a local area network (LAN) interface board, a wireless communication circuit that performs wireless communication, or a communication circuit that performs wired communication. The LAN interface board or the wireless communication circuit is connected to a network such as the Internet.

Operation Example

Figure 3:
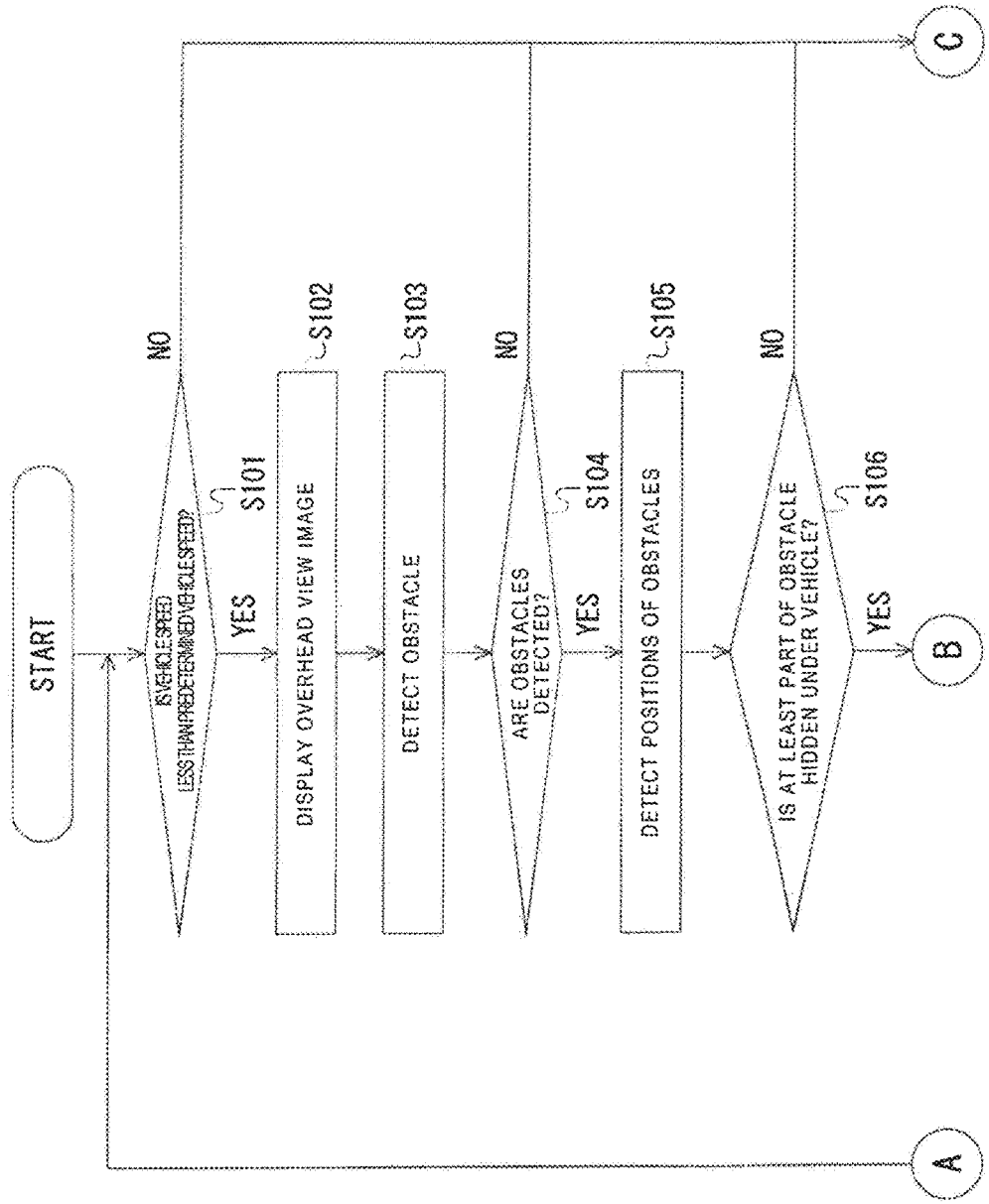
FIG. 3 is a diagram showing a first example of an operation flow of charging supporting using the charging support device.
Figure 4:
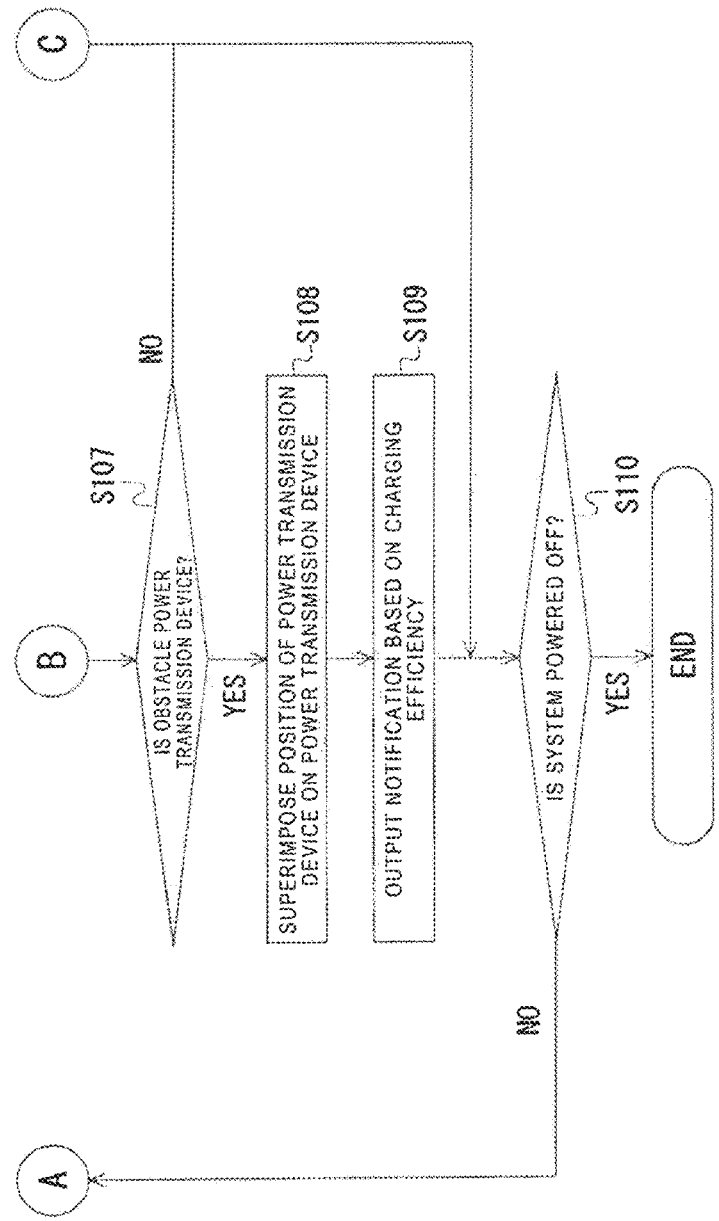
FIG. 4 is a diagram showing a second example of the operation flow of charging supporting using the charging support device.

FIGS. 3 and 4 are diagrams showing an example of an operation flow of charging support using the charging support device. "A", "B", "C" of FIG. 3 are connected to "A", "B", and "C" of FIG. 4, respectively. The operation flow of FIGS. 3 and 4 is an operation flow performed in a case where a power is supplied to the charging support device 10 from the vehicle 100 on which the charging support device 10 is mounted. In a case where a driving source of the vehicle 100 is in an activation state, for example, a system power supply is turned on, the operation flow of FIGS. 3 and 4 is started.

In S101, the information acquirer 12 of the charging support device 10 acquires a vehicle speed of the vehicle 100 by the vehicle speed sensor of the vehicle unit 50. The controller 11 determines whether or not the vehicle speed of the vehicle 100 acquired by the information acquirer 12 is equal to or less than a predetermined speed. In this example, the speed which is less than the predetermined speed is a speed when it is considered that the vehicle 100 is about to be parked in a parking space. The predetermined speed is, for example, 11 km/h. In a case where the vehicle speed of the vehicle 100 is less than the predetermined speed (S101: YES), the process proceeds to S102. In a case where the vehicle speed of the vehicle 100 is equal to or greater than the predetermined speed (S101: NO), the process proceeds to S110.

In S102, the image recognizer 13 of the charging support device 10 acquires the image captured by the imaging unit 40. Since the imaging unit 40 is provided toward the outside of the vehicle 100, the imaging unit 40 captures a surrounding image of the vehicle 100. The image recognizer 13 generates an overhead view image based on the surrounding image of the vehicle 100 captured by the imaging unit 40. The overhead view image is an image acquired by viewing the vehicle and the surrounding area of the vehicle from above the vehicle 100 in the direction of the vehicle 100. For example, an image acquired by capturing the vehicle 100 from above which is previously stored in the storage unit of the vehicle 100 is used as an image of the vehicle 100 on the overhead view image. The controller 11 displays the overhead view image generated by the image recognizer 13 on the display of the output unit 30. The display of the output unit 30 displays the overhead view image generated by the image recognizer 13. A user (driver) of the vehicle 100 may recognize a situation of the surrounding area of the vehicle 100 by seeing the overhead view image displayed on the display. The overhead view image may use the images captured by the imaging units 40 attached to the front and rear sides of the vehicle 100. The reason is that the vehicle 100 is not able to move upwards even though the power transmission device 200 is present in a horizontal direction since the vehicle 100 moves forward or rearwards but does not move in the horizontal direction.

In S103, the controller 11 detects obstacles on the surrounding image of the vehicle 100 captured by the imaging unit 40. For example, the obstacles are objects other than the vehicle 100 present on a plane (a road surface or a ground surface) formed by four bottom surfaces of tires of the vehicle 100. The obstacle may include the power transmission device 200. The controller 11 detects the obstacles in the surrounding area of the vehicle 100 through a plurality of camera images or pattern matching. The controller 11 may detect the obstacles present in the surrounding area of the vehicle 100 by using the sensor included in the vehicle 100.

In S104, the controller 11 determines whether or not the obstacles are detected in S103. In a case where the obstacles are not detected (S104: NO), the process proceeds to S110. The case where the obstacle is not detected means that the power transmission device 200 is not also detected. In a case where the obstacles are detected (S104: YES), the process proceeds to S105. The case where the obstacle is detected means that the power transmission device 200 is likely to be detected.

In S105, the controller 11 detects positions of the obstacles detected in S103. The controller 11 detects the positions of the obstacles from coordinates of the obstacles on the image. For example, the controller 11 detects the position of the obstacle as a relative three-dimensional position using the vehicle 100 as a reference. The controller 11 may detect a shape of the obstacle (which may be a mark indicating the power transmission device) together with the position, and may store the position and shape of the obstacle in the storage unit.

In S106, the controller 11 determines whether or not at least a part of the obstacle is hidden under the vehicle 100 on the overhead view image. The controller 11 compares each obstacle on the currently generated overhead view image with each obstacle on the previously generated overhead view image, and determines whether or not at least a part of the obstacle of which the entire part is seen on the previously generated overhead view image is hidden under the vehicle 100 on the currently generated overhead view image. The determination of whether or not at least a part of the obstacle is hidden under the vehicle 100 may be performed based on previously prepared vehicle size information, or may be performed by adding a capturing blind spot area in the surrounding area of the vehicle when the image is generated. The controller 11 determines whether or not at least a part of the obstacle is hidden under the vehicle 100 based on the position or shape of the obstacle, the speed or the steering angle of the vehicle 100 acquired by the information acquirer 12, and a time difference in a capturing time between the previously generated overhead view image and the currently generated overhead view image. In a case where at least a part of the obstacle is hidden under the vehicle 100 (S106: YES), the process proceeds to S107. In a case where the obstacle is not hidden under the vehicle 100 (S106: NO), the process proceeds to S110.

In S107, the controller 11 determines whether or not the obstacle of which at least a part is hidden under the vehicle 100 is the power transmission device 200. The controller 11 determines whether or not the obstacle of which at least a part is hidden under the vehicle is the power transmission device 200 (charging pad) based on the color or shape of the obstacle on the overhead view image through the known pattern matching. For example, an image of the power transmission device 200 is stored in the storage unit. In a case where the obstacle of which at least a part is hidden under the vehicle 100 is the power transmission device 200 (S107: YES), the process proceeds to S108. In a case where the obstacle of which at least a part is hidden under the vehicle 100 is not the power transmission device 200 (S107: NO), the process proceeds to S110.

In S108, the controller 11 displays the image of the obstacle (power transmission device 200) of which at least a part is hidden under the vehicle 100 so as to be superimposed on the image of the vehicle 100 on the output unit 30 on the overhead view image. A previously prepared image of the power transmission device or an image captured before the power transmission device is hidden under the vehicle 100 may be used as the image of the power transmission device 200. In this example, the controller 11 frequently acquires a movement direction and a movement distance of the vehicle 100 from the information acquirer 12. Accordingly, the controller 11 may calculate the position of the power transmission device 200 even though the power transmission device 200 is not seen on the overhead view image. The information acquirer 12 may calculate the movement direction and the movement distance of the vehicle 100 by acquiring the speed or the steering angle of the vehicle from the speed sensor or the handle of the vehicle unit 50. The movement direction and the movement distance may be calculated by the controller 11.

The controller 11 may predict the direction and the distance (movement direction and movement distance) in which the vehicle 100 moves in a processing delay time from a time when the original image of the overhead view image displayed on the output unit 30 is captured to a display time (current time) of a combined image, and may correct the display position of the power transmission device 200 based on the prediction. The direction and the distance in which the vehicle 100 moves are easily acquired from the vehicle speed or the steering angle of the vehicle 100. Accordingly, it is possible to suppress a shift between the position of the power transmission device 200 on the screen by the processing delay time of the image and the actual position of the power transmission device 200.

In S109, the controller 11 outputs notification based on charging efficiency in the current position of the power transmission device 200 to the driver (user) of the vehicle 100. In this example, the controller 11 acquires a distance between the position (the central position of the power transmission coil) of the power transmission device 200 displayed on the overhead view image and the position (the central position of the power reception coil) of the power reception unit 20 of the vehicle 100. The charging efficiency is a function of the distance. The longer the distance is, the lower the charging efficiency is. For example, the charging efficiency is in inverse proportion to the distance. Thus, the controller 11 may acquire the charging efficiency from the distance. The power reception unit 20 may communicate with the power transmission device 200, and thus, the controller 11 may measure the charging efficiency between the power reception unit 20 and the power transmission device 200. The controller 11 changes the color of the power transmission device 200 on the overhead view image based on the charging efficiency. In a case where the charging efficiency is less than a first predetermined value, the controller 11 sets the color of the power transmission device 200 to red. The charging efficiency is equal to or greater than the first predetermined value, and thus, the controller 11 gradually changes the color of the power transmission device 200 from red to yellow and green as the value becomes greater. In a case where the charging efficiency becomes higher and the charging efficiency is equal to or greater than a second predetermined value (>first predetermined value), the controller 11 sets the color of the power transmission device 200 to green. That is, the controller outputs information indicating that the vehicle is positioned in an optimum charging position. Accordingly, the driver (user) of the vehicle 100 may improve the charging efficiency of the battery by parking the vehicle such that the color of the power transmission device on the overhead view image is green. The display form of the power transmission device 200 displayed on the output unit 30 is changed depending on the charging efficiency, and thus, the driver of the vehicle 100 may recognize the charging efficiency in the current position of the power transmission device 200.

In S110, the controller 11 determines whether or not the system of the vehicle 100 is powered off. In a case where the system is powered off (S110, YES), the operation flow of FIGS. 3 and 4 is ended. In a case where the system is powered off (S110: NO), the process is returned to S101.

Although the charging efficiency is acquired and the color of the power transmission device 200 is changed to the color depending on the charging efficiency in S109, a case where the charging efficiency is acquired is synonymous with a case where the distance between the position (for example, the central position of the power transmission coil) of the power transmission device 200 and the position (for example, the central position of the power reception coil) of the power reception unit 20 of the vehicle 100 is acquired. That is, since there is one to one correspondence between the charging efficiency and the distance, the distance is acquired, and thus, the color of the power transmission device 200 may be changed based on the distance. For example, the controller 11 sets the color of the power transmission device 200 to red in a case where the distance is equal to or greater than a first predetermined distance. In a case where the distance is less than the first predetermined distance and the distance becomes shorter, the controller 11 gradually changes the color of the power transmission device 200 from red to yellow and green. In a case where the distance becomes shorter and the distance is equal to or less than a second predetermined distance (<first predetermined distance), the controller 11 sets the color of the power transmission device 200 to green. Accordingly, the driver (user) of the vehicle 100 may improve the charging efficiency of the battery by parking the vehicle such that the color of the power transmission device on the overhead view image is green. In the following description, the charging efficiency may also be similarly changed to the distance between the power transmission device 200 and the power reception unit 20.

Figure 5:
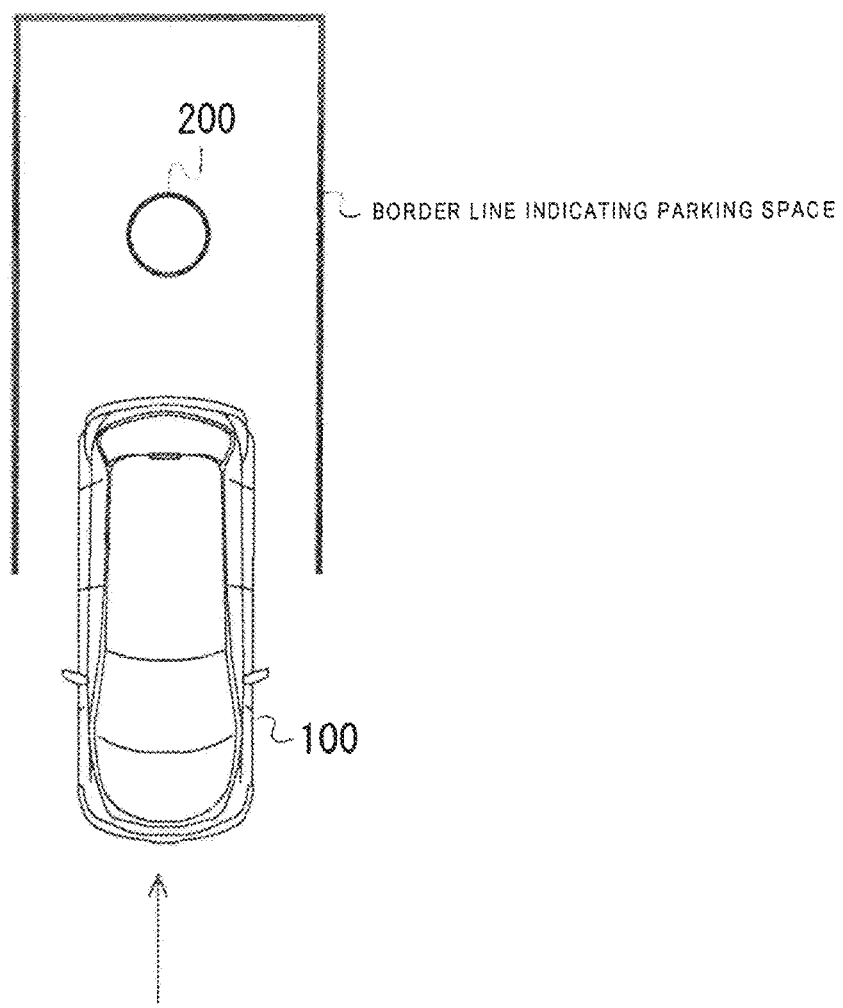
FIG. 5 is a diagram showing a first example of an overhead view image displayed on an output unit according to the embodiment.
Figure 6:
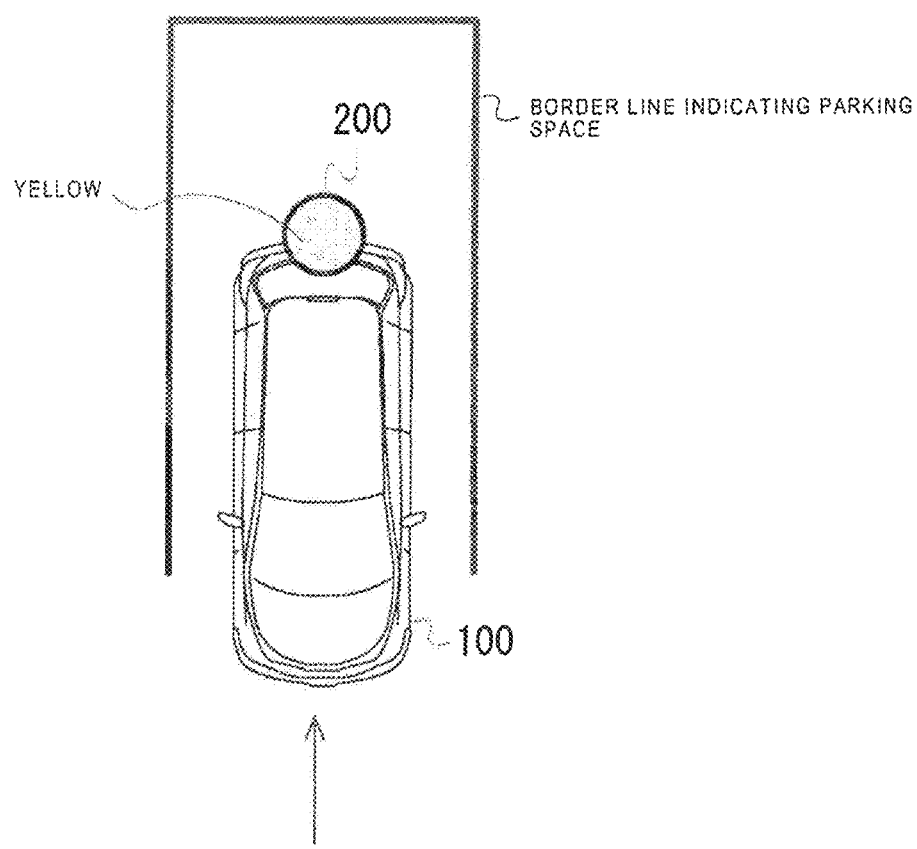
FIG. 6 is a diagram showing a second example of the overhead view image displayed on the output unit according to the embodiment.
Figure 7:
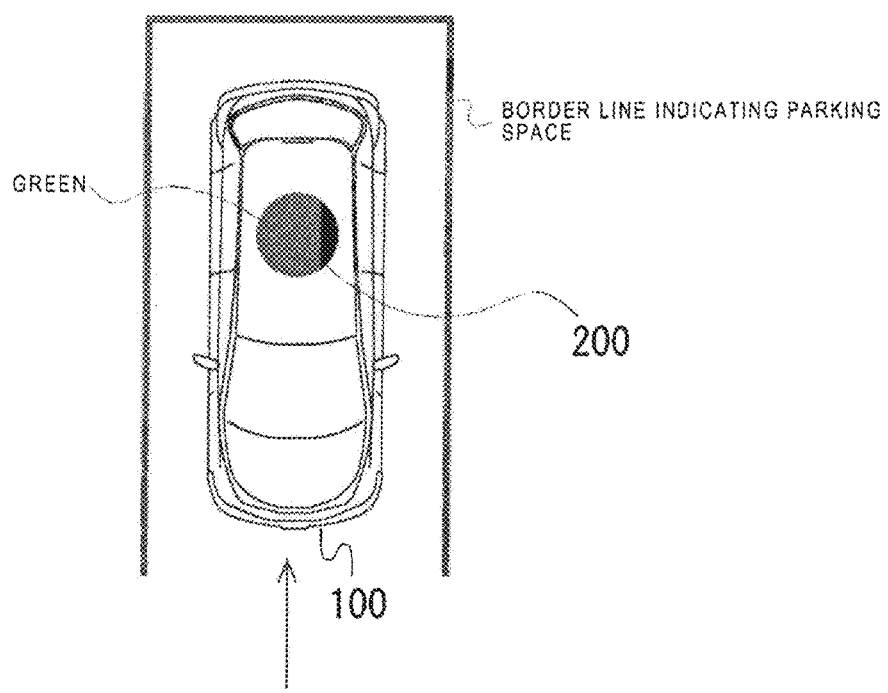
FIG. 7 is a diagram showing a third example of the overhead view image displayed on the output unit according to the embodiment.

FIGS. 5 to 7 are diagrams showing examples of the overhead view image displayed on the output unit according to the embodiment. In FIGS. 5 to 7, a border line indicating the parking space, the vehicle 100, and the power transmission device 200 are depicted. The vehicle 100 is about to be parked in the parking space indicated by the border line. The power transmission device 200 is present in the parking space. Arrow in each diagram indicates a movement direction of the vehicle 100. The vehicle 100 shown in FIGS. 5 to 7 is an image previously stored in the storage unit, and the image of the vehicle 100 is displayed so as to be superimposed on the overhead view image generated based on the captured image. The power transmission device 200 of FIG. 5 is an actual image, and the power transmission device 200 of FIGS. 6 and 7 is an image stored in the storage unit. In FIG. 5, the vehicle 100 moves backwards and approaches the power transmission device 200. In FIG. 6, the vehicle 100 moves backwards from the state of FIG. 5, and a part of the power transmission device 200 is hidden under the vehicle 100. However, the power transmission device 200 is displayed so as to be superimposed on the vehicle 100 on the overhead view image. Since the charging efficiency is equal to or greater than the first predetermined value or the distance between the power transmission device 200 and the power reception unit 20 is equal to or less than the first predetermined distance, the power transmission device 200 is displayed in yellow. In FIG. 7, the vehicle 100 further moves backwards from the state of FIG. 6, and the power transmission device 200 is completely hidden under the vehicle 100. However, the power transmission device 200 is displayed so as to be superimposed on the vehicle 100 on the overhead view image. Since the charging efficiency is equal to or greater than the second predetermined value or the distance between the power transmission device 200 and the power reception unit 20 is equal to or less than the second predetermined distance, the power transmission device 200 is displayed in green. The driver of the vehicle 100 may charge the battery with high charging efficiency by stopping the vehicle 100 in this position (the optimum position for charging). A surrounding overhead view image of the vehicle is frequently updated for a period during which the obstacle is detected and the vehicle is positioned in the power transmission device, and a current surrounding situation is displayed in real time. Accordingly, the user can guide the vehicle to the position of the power transmission device 200 while ascertaining the surrounding situation. The movement of the vehicle with respect to the power transmission device 200 may be manual driving of the driver or may be automatic driving of the vehicle. In a case where the driver automatically parks the vehicle, the vehicle is controlled such that the vehicle stops in a position which is an optimum position on the power transmission device 200 within a parking area as a parking optimum position.

Modification Example 1

In S109, the color of the power transmission device 200 displayed on the overhead view image is changed depending on the charging efficiency, and thus, it is possible to easily recognize the charging efficiency. In this example, the size of the power transmission device 200 displayed on the overhead view image is changed depending on the charging efficiency, and thus, it is possible to easily recognize the charging efficiency.

Figure 8:
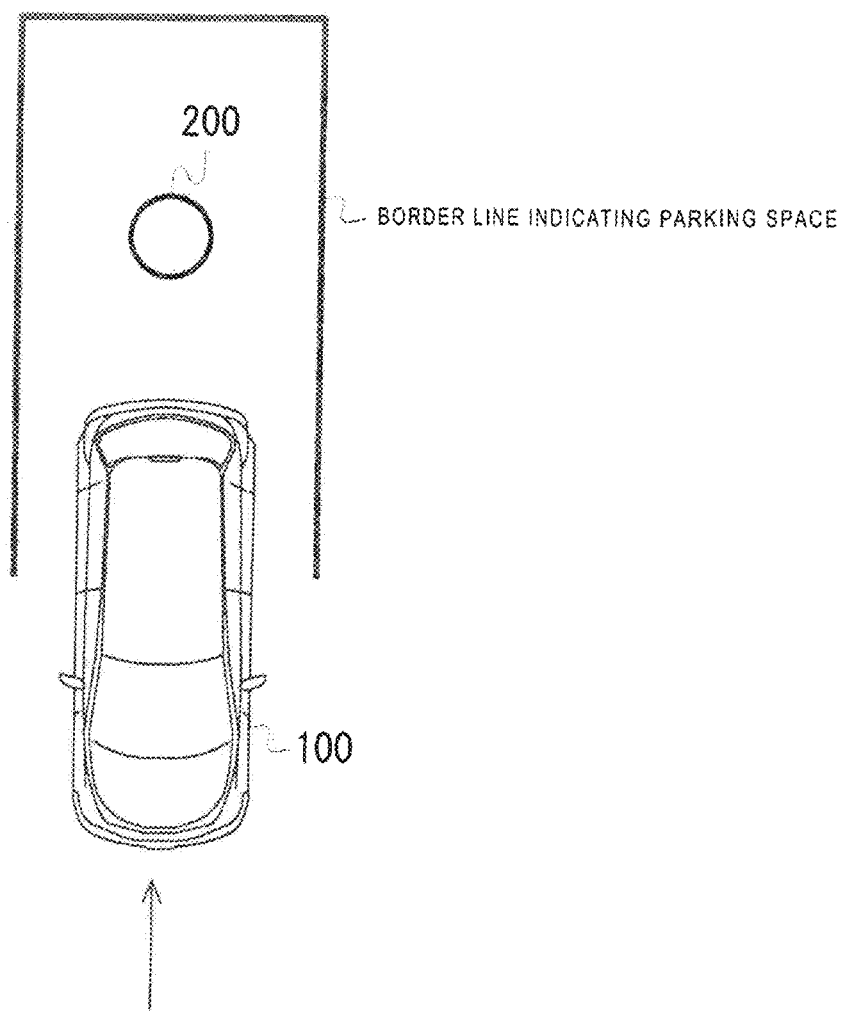
FIG. 8 is a diagram showing a first example of the overhead view image displayed on the output unit according to Modification Example 1.
Figure 9:
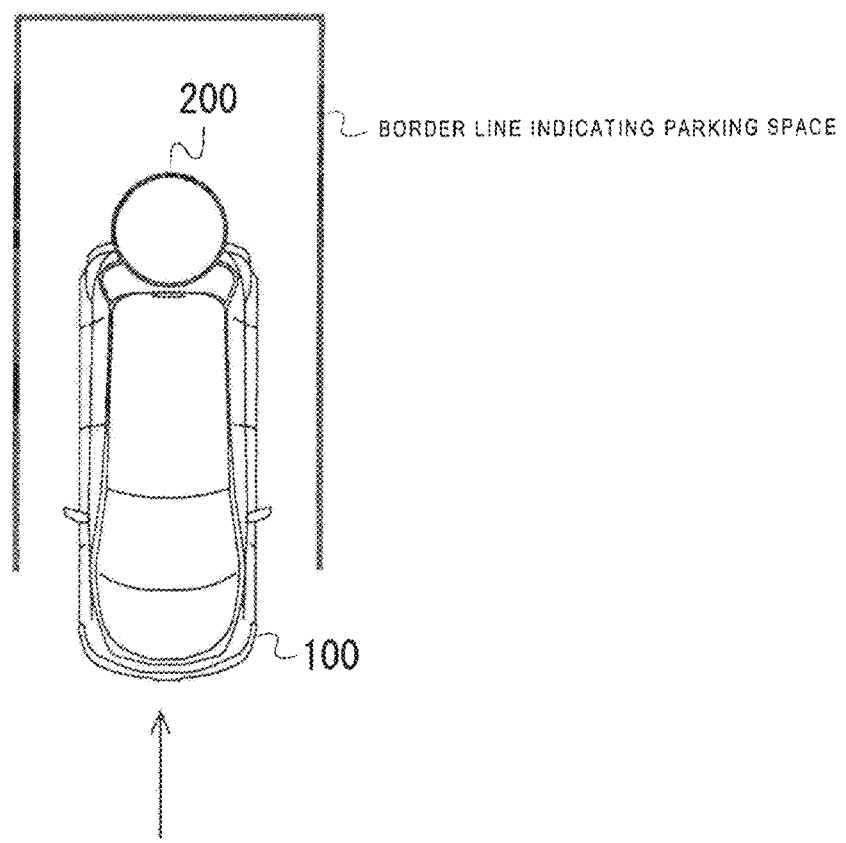
FIG. 9 is a diagram showing a second example of the overhead view image displayed on the output unit according to Modification Example 1.
Figure 10:
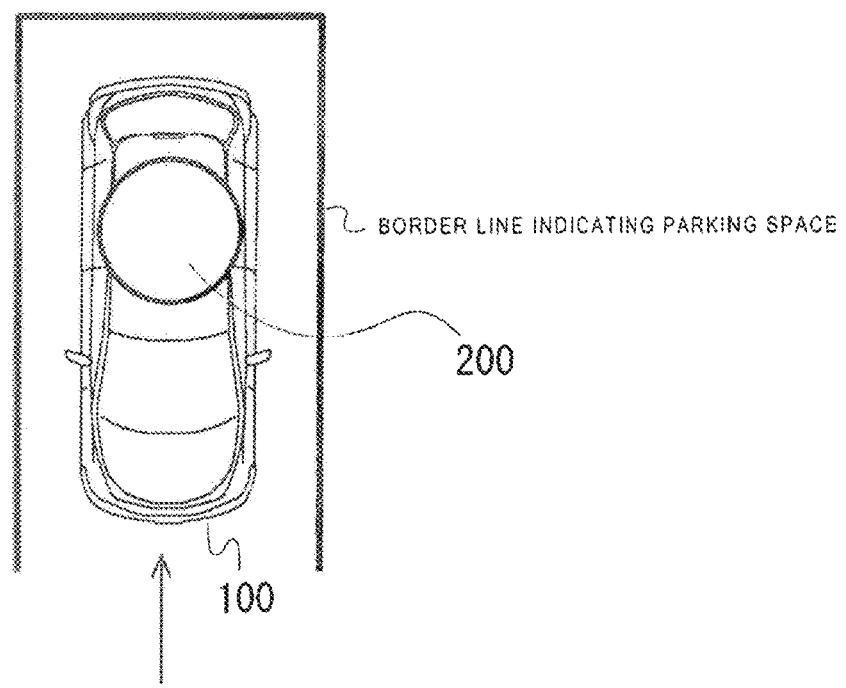
FIG. 10 is a diagram showing a third example of the overhead view image displayed on the output unit according to Modification Example 1.

FIGS. 8 to 10 are diagrams showing examples of the overhead view image displayed on the output unit according to Modification Example 1. In FIGS. 8 to 10, a border line indicating the parking space, the vehicle 100, and the power transmission device 200 are depicted. The vehicle 100 is about to be parked in the parking space indicated by the border line. The power transmission device 200 is present in the parking space. Arrow in each diagram indicates a movement direction of the vehicle 100. In FIG. 8, the vehicle 100 moves backwards, and approaches the power transmission device 200. In FIG. 9, the vehicle 100 moves backwards from the state of FIG. 8, and a part of the power transmission device 200 is hidden under the vehicle 100. However, the power transmission device 200 is displayed so as to be superimposed on the vehicle 100 on the overhead view image. Since the charging efficiency is equal to or greater than the first predetermined value, the power transmission device 200 is displayed so as to be larger than that of FIG. 8. In FIG. 10, the vehicle 100 further moves backwards from the state of FIG. 9, and the power transmission device 200 is completely hidden under the vehicle 100. However, the power transmission device 200 is displayed so as to be superimposed on the vehicle 100 on the overhead view image. Since the charging efficiency is equal to or greater than the second predetermined value, the power transmission device 200 is displayed so as to be larger. In this example, the driver of the vehicle 100 may charge the battery with high charging efficiency by stopping the vehicle 100.

The controller 11 may expand or contract the display of the overhead view image such that the position (the central position of the power transmission coil) of the power transmission device 200 and the position (the central position of the power reception coil) of the power reception unit 20 do not move on the overhead view image. Accordingly, as the power transmission device 200 further approaches the vehicle 100, the entire display is displayed so as to be expanded. The driver of the vehicle 100 may charge the battery with high charging efficiency by stopping the vehicle 100 in a state in which the overhead view image is expanded.

Modification Example 2

In S109, the color of the power transmission device 200 displayed on the overhead view image is changed depending on the charging efficiency, and thus, it is possible to easily recognize the charging efficiency. In this example, the color and size of the power transmission device 200 displayed on the overhead view image are changed depending on the charging efficiency, and thus, it is possible to easily recognize the charging efficiency.

Figure 11:
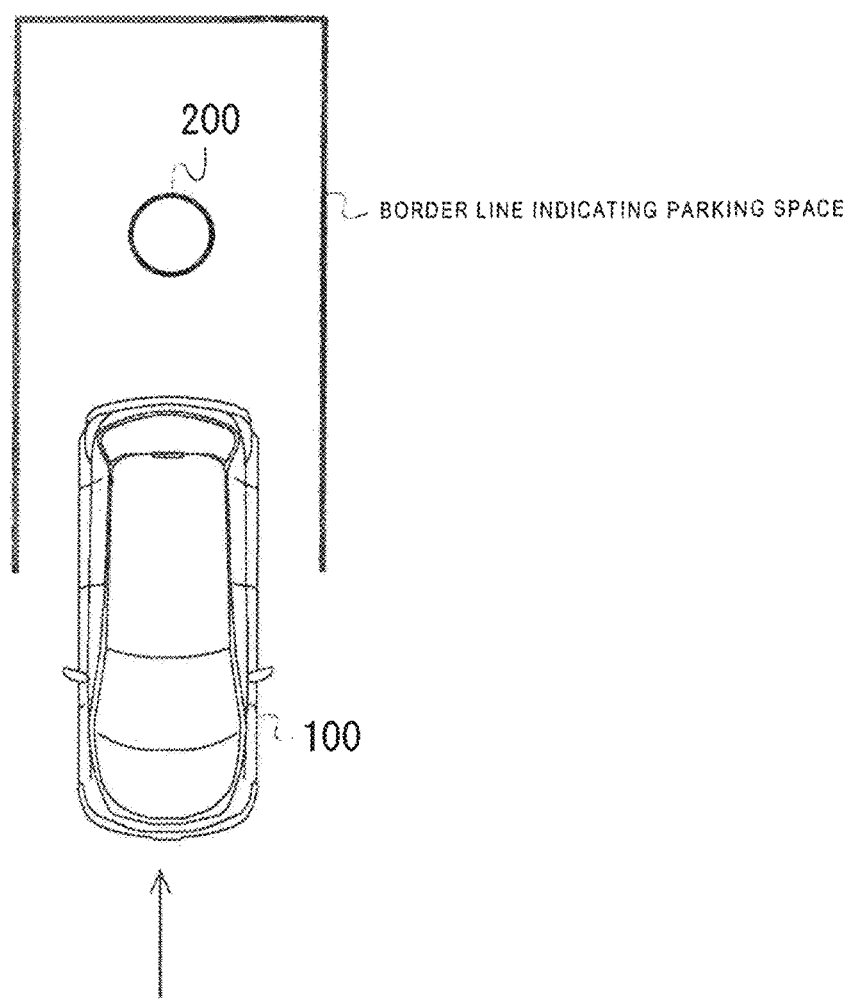
FIG. 11 is a diagram showing a first example of the overhead view image displayed on the output unit according to Modification Example 2.
Figure 12:
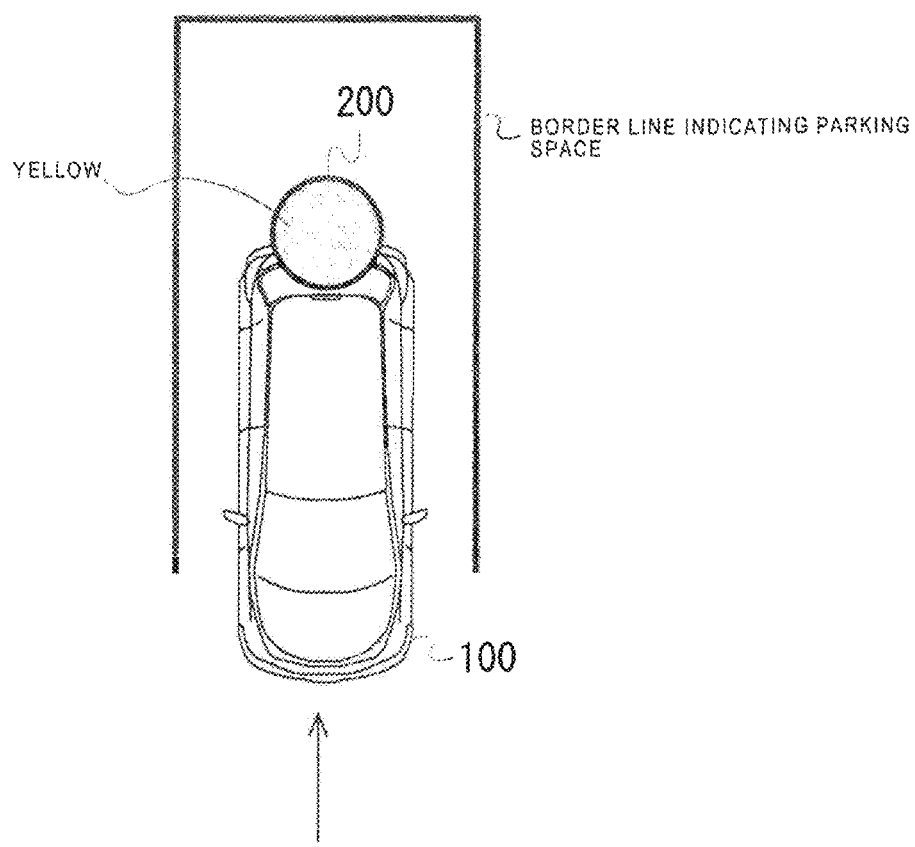
FIG. 12 is a diagram showing a second example of the overhead view image displayed on the output unit according to Modification Example 2.
Figure 13:
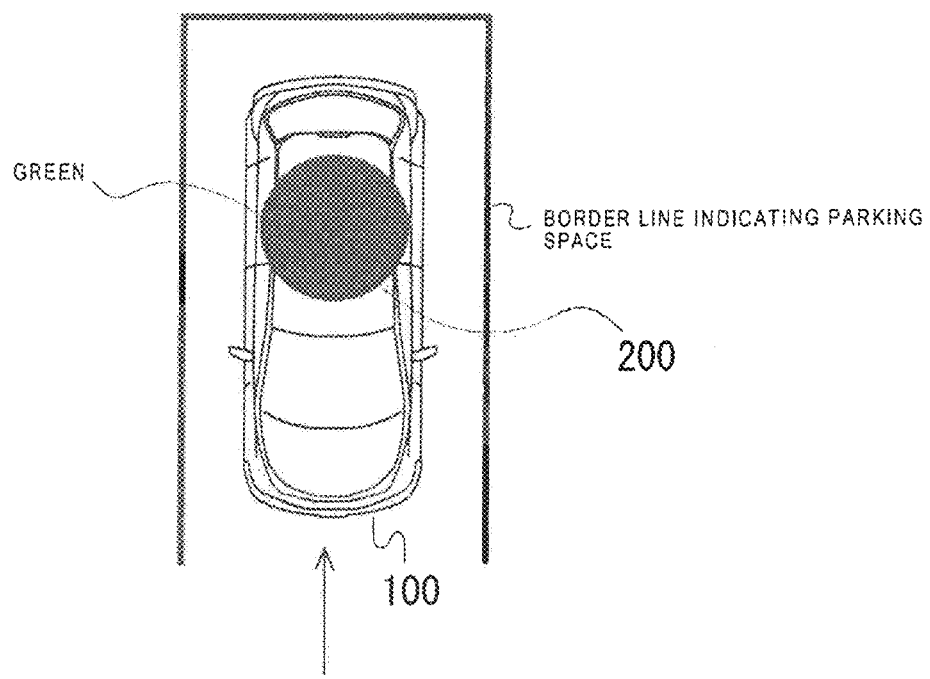
FIG. 13 is a diagram showing a third example of the overhead view image displayed on the output unit according to Modification Example 2.

FIGS. 11 to 13 are diagrams showing examples of the overhead view image displayed on the output unit according to Modification Example 2. In FIGS. 11 to 13, a border line indicating the parking space, the vehicle 100, and the power transmission device 200 are depicted. The vehicle 100 is about to be parked in the parking space indicated by the border line. The power transmission device 200 is present in the parking space. Arrow in each diagram indicates a movement direction of the vehicle 100. In FIG. 11, the vehicle 100 moves backwards, and approaches the power transmission device 200. In FIG. 12, the vehicle 100 moves backwards from the state of FIG. 11, and a part of the power transmission device 200 is hidden under the vehicle 100. However, the power transmission device 200 is displayed so as to be superimposed on the vehicle 100 on the overhead view image. Since the charging efficiency is equal to or greater than the first predetermined value, the power transmission device 200 is displayed so as to be larger than that of FIG. 11, and is displayed in yellow. In FIG. 13, the vehicle 100 further moves backwards from the state of FIG. 12, and the power transmission device 200 is completely hidden under the vehicle 100. However, the power transmission device 200 is displayed so as to be superimposed on the vehicle 100 on the overhead view image. Since the charging efficiency is equal to or greater than the second predetermined value, the power transmission device 200 is displayed so as to be larger, and is displayed in green. The driver of the vehicle 100 can more easily recognize a position (optimum position for charging) having high charging efficiency.

Modification Example 3

In S109, the color of the power transmission device 200 displayed on the overhead view image is changed depending on the charging efficiency, and thus, it is possible to easily recognize the charging efficiency. In this example, the controller 11 may easily recognize the charging efficiency by changing sound output from the speaker of the output unit 30 depending on the charging efficiency. Accordingly, the driver of the vehicle 100 can easily recognize the charging efficiency even without seeing the display. In this case, the controller 11 and the image recognizer 13 may not display and may not generate the overhead view image.

Modification Example 4

In S109, the color of the power transmission device 200 displayed on the overhead view image is changed depending on the charging efficiency, and thus, it is possible to easily recognize the charging efficiency. The charging efficiency is maximized in a case where the power reception unit 20 of the vehicle 100 and the power transmission device 200 are closest. In this example, the position of the power transmission device 200 displayed on the overhead view image and the position of the power reception unit 20 of the vehicle 100 are displayed, and thus, the driver of the vehicle 100 may easily drive the vehicle such that the power reception unit 20 of the vehicle 100 approaches the power transmission device 200. Accordingly, the driver of the vehicle 100 can easily recognize the charging efficiency depending on the distance between the position of the power transmission device 200 and the position of the power reception unit 20 of the vehicle 100.

Figure 14:
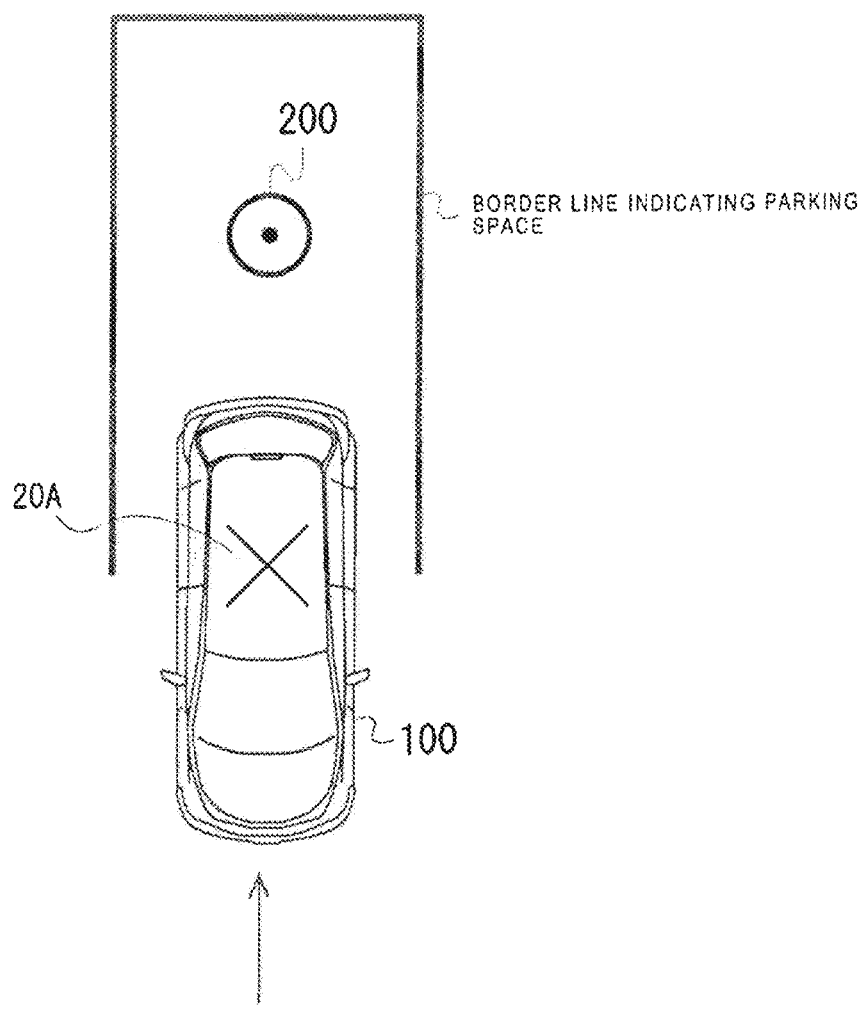
FIG. 14 is a diagram showing a first example of the overhead view image displayed on the output unit according to Modification Example 4.
Figure 15:
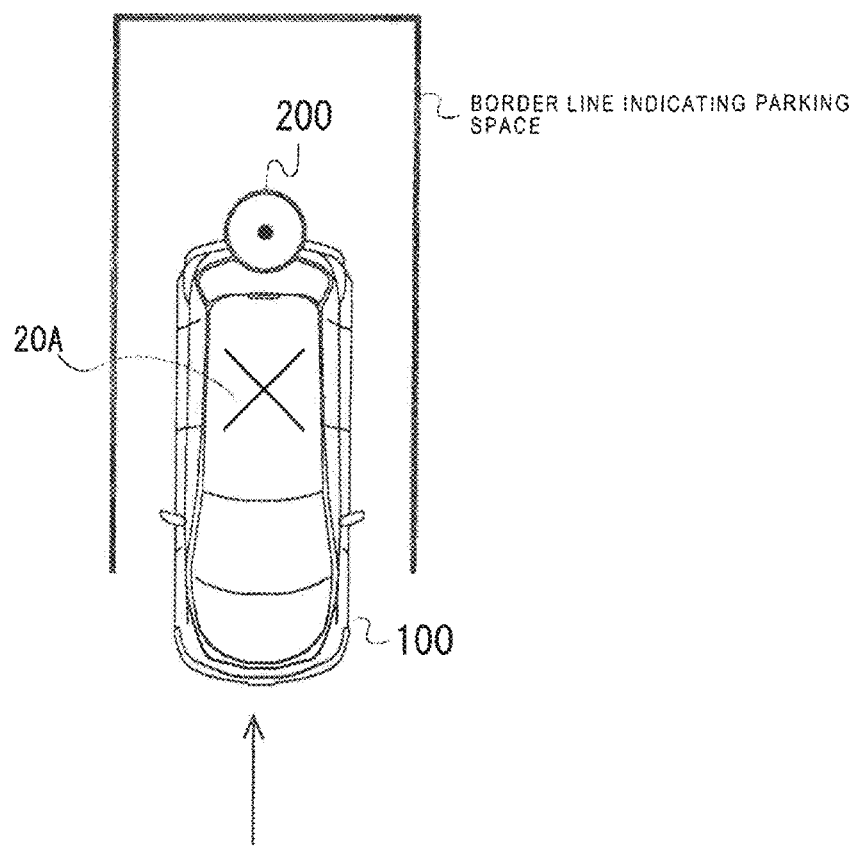
FIG. 15 is a diagram showing a second example of the overhead view image displayed on the output unit according to Modification Example 4.
Figure 16:
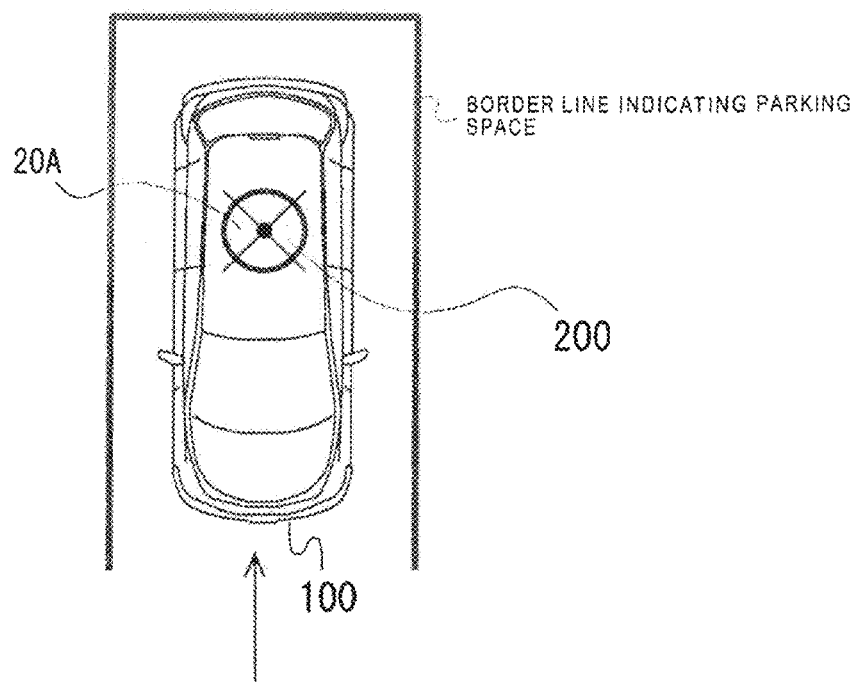
FIG. 16 is a diagram showing a third example of the overhead view image displayed on the output unit according to Modification Example 4.

FIGS. 14 to 16 are diagrams showing a modification example of the overhead view image displayed on the output unit according to the embodiment. In FIGS. 14 to 16, a border line indicating the parking space, the vehicle 100, and the power transmission device 200 are depicted. A predetermined mark (black circle mark) is depicted in the center of the power transmission device 200. The position of the power reception unit 20 is represented in the vehicle 100 by a predetermined mark 20A (X mark). The vehicle 100 is about to be parked in the parking space indicated by the border line. The power transmission device 200 is present in the parking space. Arrow in each diagram indicates a movement direction of the vehicle 100. In FIG. 14, the vehicle 100 moves backwards, and approaches the power transmission device 200. In FIG. 15, the vehicle 100 moves backwards from the state of FIG. 14, and a part of the power transmission device 200 is hidden under the vehicle 100. However, the power transmission device 200 is displayed so as to be superimposed on the vehicle 100 on the overhead view image. A predetermined mark (black circle) is depicted in the center of the power transmission device 200. The position of the power reception unit 20 of the vehicle 100 is depicted by the predetermined mark 20A. The driver may park the vehicle 100 in a position having high power reception efficiency by operating the vehicle 100 such that the center of the power transmission device 200 is overlapped with the center of the predetermined mark 20A of the power reception unit 20. In FIG. 16, the vehicle 100 further moves backwards from the state of FIG. 15, and the power transmission device 200 is completely hidden under the vehicle 100. However, the power transmission device 200 is displayed so as to be superimposed on the vehicle 100 on the overhead view image. The predetermined mark 20A indicating the position of the power reception unit 20 of the vehicle 100 is displayed so as to be superimposed on the vehicle 100 on the overhead view image. The driver of the vehicle 100 may charge the battery with high charging efficiency by stopping the vehicle 100 such that the center of the power transmission device 200 matches the center of the power reception unit 20 (the predetermined mark of the power transmission device 200 is aligned with the predetermined mark 20A of the power reception unit 20). The driver drives the vehicle while checking the predetermined mark indicating the power transmission device 200 displayed on the output unit 30 and the predetermined mark 20A indicating the power reception unit 20, and thus, the power transmission device 200 and the power reception unit 20 can be easily aligned.

Although it has been described in Modification Example 4 that the power transmission device 200 and the mark 20A indicating the position of the power reception unit 20 are displayed, the color or size (including the mark or shape) of the power transmission device 200 may be changed depending on the charging efficiency or the color or size (including the mark or shape) of the mark 20A indicating the position of the power reception unit 20 may be changed depending on the charging efficiency, as in the embodiment. That is, the color or size (including the mark or shape) of at least one of the power transmission device 200 and the mark 20A indicating the position of the power reception unit 20 may be changed depending on the charging efficiency.

Others

In the above-described operation flows, after a part of the power transmission device 200 is hidden under the vehicle 100 on the overhead view image, the charging efficiency is acquired, and the notification depending on the charging efficiency is output. In this example, in a case where the obstacle is detected in S103, the controller determines whether or not the obstacle is the power transmission device 200, calculates the charging efficiency even though the power transmission device 200 is not hidden under the vehicle 100 on the overhead view image, and outputs the notification depending on the charging efficiency. Accordingly, the driver of the vehicle 100 can recognize the charging efficiency at an earlier stage.

The detected obstacle may be displayed so as to be highlighted on the overhead view image. The detected obstacle may be highlighted by thickening the contour of the obstacle or blinking the obstacle. The obstacle is displayed so as to be highlighted, thus, the driver of the vehicle 100 easily recognizes the obstacle. The power transmission device 200 may not be displayed so as to be highlighted. Only the power transmission device 200 among the obstacles may be displayed so as to be highlighted. The power transmission device 200 is differently displayed, and thus, the driver easily recognizes the power transmission device 200.

In a case where the power transmission device 200 is buried in the ground, since the power transmission device 200 is integrated with the ground, the power transmission device is not recognized as the obstacle. In this case, the controller 11 detects the power transmission device 200 by recognizing the predetermined mark on the ground indicating that the power transmission device 200 is buried in the ground.

Actions and Advantages of Embodiment

The charging support device 10 outputs the notification depending on the charging efficiency corresponding to the position of the power transmission device 200, and thus, the driver of the vehicle 100 can easily recognize the charging efficiency. The driver can easily park the vehicle 100 in the position having high charging efficiency.

While the embodiment of the present invention has been described, the embodiment is merely an example, and the present invention is not limited thereto. The embodiment may be variously changed based on the knowledge of those skilled in the art without departing from the gist of claims. The configuration examples may be combined and implemented as much as possible.

Computer-readable Recording Medium

A program causing a computer, another machine, or another device (hereinafter, referred to as a computer or the like) to realize any of the above-described functions may be recorded in a recording medium readable by the computer or the like. The program of the recording medium is read into and is executed in the computer or the like, and thus, the function may be provided.

The recording medium readable by the computer or the like is a recording medium that may accumulate information items such as data items or programs by an electrical, magnetic, optical, mechanical, or chemical action and may read by the computer or the like. Elements such as the CPU and the memory constituting the computer may be provided in the recording medium, and the program may be executed by the CPU.

For example, a flexible disk, a magneto-optical disk, CD-ROM, CD-R/W, DVD, DAT, 8-mm tape, or a memory card is used as the recording medium capable of being detached from the computer or the like.

A hard disk or ROM is used as the recording medium fixed to the computer or the like.

While the invention has been shown and described in detail, the foregoing description is in all aspects illustrative and not restrictive. It is therefore understood that numerous other modifications and variations can be devised without departing from the scope of the invention.

What is claimed is:

1. A charging support device used in charging a battery of a vehicle having a power reception unit on a bottom surface of the vehicle with power supplied from a power transmission device located outside the vehicle, the charging support device comprising:
   a controller that generates an overhead view image that displays a vehicle image of the vehicle and an image of a surrounding area of the vehicle captured by a camera, the controller detecting a position of the power transmission device based on the image captured by the camera, calculating the position of the power transmission device based on a moving direction and a moving distance of the vehicle after the power transmission device is hidden under the vehicle, displaying, in the overhead view image, (i) a first mark indicating a position of the power reception unit and (ii) a second mark indicating the position of the power transmission device, and varying a color or a size of at least one of the first and second marks in the overhead view image in a case where the power reception unit is positioned in a predetermined position.

2. A charging support device used in charging a battery of a vehicle having a power reception unit on a bottom surface of the vehicle with power supplied from a power transmission device located outside the vehicle, the charging support device comprising:

a controller that generates an overhead view image that displays a vehicle image of the vehicle and image of a surrounding area of the vehicle captured by a camera, the controller calculating a position of the power transmission device based on a) the image captured by the camera, b) a moving direction of the vehicle and c) a moving distance of the vehicle, not displaying, in the overhead view image, (i) a first mark indicating a position of the power reception unit and (ii) a second mark indicating the position of the power transmission device while the power transmission device is being shown in the captured image, displaying, in the overhead view image, the first mark and the second mark after the power transmission device is hidden under the vehicle, and varying a color or a size of at least one of the first and second marks in the overhead view image in a case where the power reception unit is positioned in a predetermined position.

3. A charging support device used in charging a battery of a vehicle having a power reception unit on a bottom surface of the vehicle with power supplied from a power transmission device located outside the vehicle, the charging support device comprising:

a controller that generates an overhead view image that displays a vehicle image of the vehicle and an image of a surrounding area of the vehicle captured by a camera, the controller calculating a position of the power transmission device based on a) the image captured by the camera, b) a moving direction of the vehicle, and c) a moving distance of the vehicle, displaying, in the overhead view image, (i) a first mark indicating a position of the power reception unit and (ii) a second mark indicating the position of the power transmission device, and varying a color or a size of at least one of the first and second marks in the overhead view image in a case where the power reception unit is positioned in a predetermined position.

4. A charging support device used in charging a battery of a vehicle having a power reception unit on a bottom surface of the vehicle with power supplied from a power transmission device located outside the vehicle, the charging support device comprising:

a controller that generates an overhead view image that displays a vehicle image of the vehicle and an image of a surrounding area of the vehicle captured by a camera, the controller calculating a position of the power transmission device based on a) the image captured by the camera, b) a moving direction of the vehicle, and c) a moving distance of the vehicle, displaying, in the overhead view image, (i) a first mark indicating a position of the power reception unit and (ii) a second mark indicating the position of the power transmission device, and varying a color or a size of at least one of the first and second marks in the overhead view image in a case where a distance between the position of the power reception unit and the position of the power transmission device becomes a predetermined distance.

* * * * *